T. H. BRITTAIN.
LEVEL.
APPLICATION FILED MAY 2, 1908.
940,671.
Patented Nov. 23, 1909.
2 SHEETS—SHEET 1.
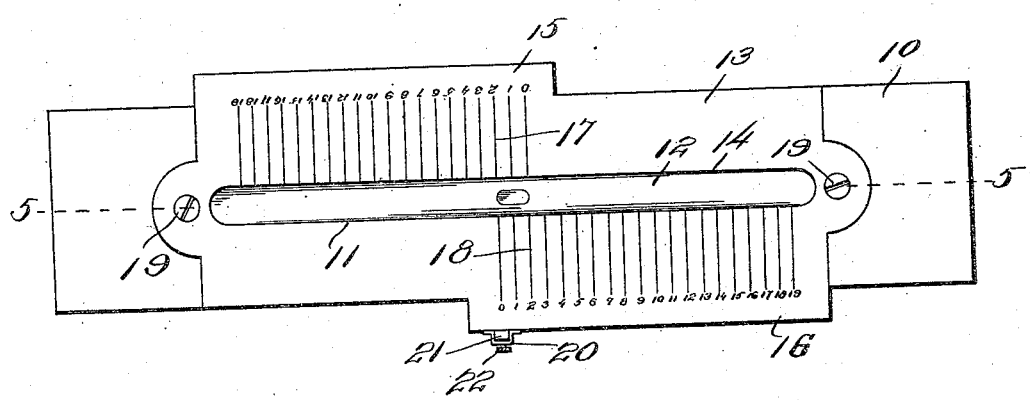
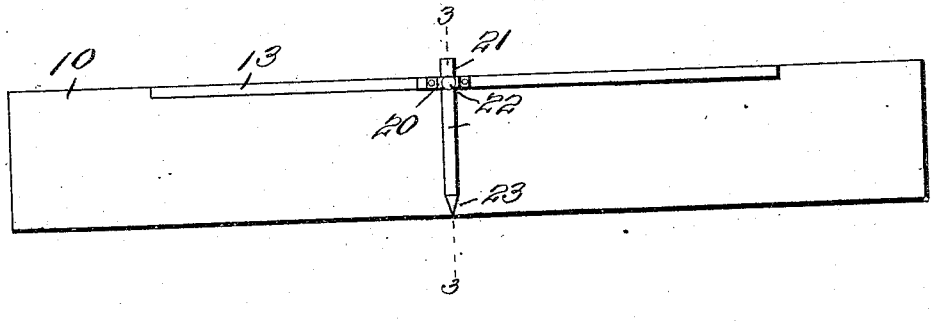
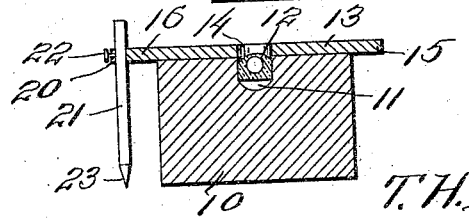
Inventor
T. H. Brittain,
By Woodward & Chandlee
Attorneys T. H. BRITTAIN.
LEVEL.
APPLICATION FILED MAY 2, 1908.
940,671.
Patented Nov. 23, 1909.
2 SHEETS—SHEET 2.
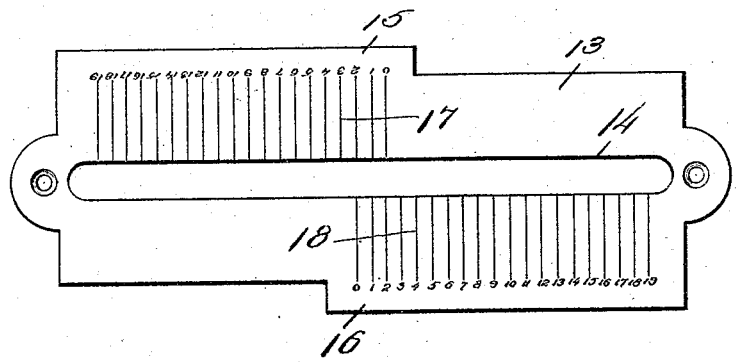
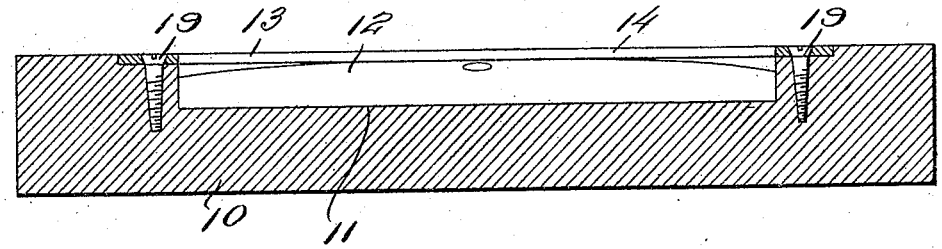
Witnesses
Inventor
T. H. Brittain,
By Woodward & Chandlee
Attorneys

UNITED STATES PATENT OFFICE.

THOMAS H. BRITTAIN, OF PRAIRIE VIEW, TEXAS.

LEVEL.

940,671.  Specification of Letters Patent.  Patented Nov. 23, 1909.

Application filed May 2, 1908. Serial No. 430,571.

*To all whom it may concern:*

Be it known that I, THOMAS H. BRITTAIN, a citizen of the United States, residing at Prairie View, in the county of Waller and State of Texas, have invented certain new and useful Improvements in Levels, of which the following is a specification.

This invention relates to measuring instruments and more particularly to that class known and described as spirit levels.

One object of the invention is to produce a more accurate instrument than has heretofore been produced.

Another object is to construct an instrument of this nature by the use of which may be readily calculated the distance that a certain portion of the object to be leveled should be raised or lowered to bring it to the horizontal.

A further object is to provide a scale on a level of this character that may be read with greater facility than the ordinary scale.

A still further object is to provide a certain definite ratio between the scale readings and the distance through which the object to be leveled is moved.

Other objects and advantages will be apparent from the following description, and it will be understood that changes in the specific structure shown and described may be made within the scope of the claim and that any suitable materials may be used without departing from the spirit of the invention.

In the drawings forming a portion of this specification, and in which like numerals of reference indicate similar parts in the several views, Figure 1 is a top plan view of the complete level, Fig. 2 is a side elevation of the same, Fig. 3 is a cross sectional view on the line 3—3 of Fig. 2, Fig. 4 is a top plan view of the scale detached from the instrument, Fig. 5 is a section on the line 5—5 of Fig. 1.

Referring to the drawings, 10 represents the stock of the instrument which is of ordinary construction having a centrally elongated pocket 11 into which is inserted a curved spirit tube 12 having the apex of its arc disposed outwardly. Upon the upper face of the stock 10 is secured a metal plate 13 having formed therein a central elongated slot 14 adapted to register with the pocket 11 when in position. The plate 13 carries diagonally disposed offset portions 15 and 16 upon which are formed the scales 17 and 18 for determining the deflection of the air bubble from the center of the spirit tube 12. The offset portions 15 and 16 are so positioned as to bring the scales 17 and 18 into overlapped relation with their zero points spaced longitudinally a distance equal to the length of the air bubble. By this arrangement a scale is arranged on each side of the air bubble and the zero point is placed at the farthermost end of the air bubble as regards each of said scales. The metal plate 13 may be secured to the stock 10 in any suitable manner as by screws 19. Upon the outer edge of the offset portion 16 is mounted a sleeve member 20, the aperture through which is preferably rectangular and which holds a rod or pointer 21 rigidly secured therein by a set screw 22. This sleeve 20 is so mounted as respects the offset portion 16 that the pointer 21 will be directly opposite the zero point of scale 18, and as pointer 21 extends downwardly on one side of the stock 10 it is apparent that the zero point will be indicated at the base of the stock 10 where said pointer rests on the object to be leveled. It is preferred that the pointer 21 be reduced at its lower end as at 23 thus defining more accurately the position of the zero point. After the reading of the level has been taken, by tipping the instrument laterally the point of the member 23 may be brought into engagement with the supporting surface and the subsequent operation conducted after the level is removed. It will be understood that any desired units of measurement may be indicated by the scale.

The curvature of the tube 12 and the intervals on the scales are such that the position of the bubble with relation to the scales indicates or corresponds with the exact linear distance through which and the direction in which the portion of the object at a certain distance from the pointer is to be raised. As shown, the divisions of the scale are at intervals of one-eighth of an inch, and the curvature of the tube is such that the vertical movement of the supporting surface at a point distant one foot longitudinally of the level corresponds to the relative movement of the bubble between the scales. When the instrument is positioned upon the object to be tested and the air bubble moves toward one end of the same it is an indication that the portion of the object oppositely of the instrument is to be raised a sufficient height to return the air bubble to the normal position between the two zero points.

In a device constructed as herein set forth there is a definite ratio between the position of the bubble with relation to the scale and the distance through which the object operated on is to be raised in order to be brought into a horizontal plane. Thus, when the level is positioned upon a beam, for instance, the bubble indicates the third division from zero upon the scale when it is at rest, at a distance of one foot longitudinally upon the beam from the point 23 the beam is to be raised or lowered, according to the direction in which the longitudinal measurement is made through a distance equal to the three divisions marked off upon the scale designating the displacement of the air bubble from its normal position. Correspondingly, at a distance of three feet from the point 23, the distance through which the object must be moved is three times that indicated on the scale of the level.

The pointer 21 indicates on the object to be leveled where the zero point of the level is, and if the surface is not level one foot must be measured from the pointer which determines the point on the object which must be raised the distance indicated on the scale 17 or 18 adjacent such point to bring the object into a perfect horizontal plane. If the measurement taken is three feet from the base 23 of the rod then at the last determined point the object will have to be raised through a distance equal to three times that indicated on the scale to be in the horizontal plane. Thus it will be seen that the distance which the bubble moves must be multiplied by the number of feet measured in the opposite direction to determine the extent of movement at the measured point.

What is claimed is:

In a level, the combination with a stock and a spirit tube in said stock, of a plate disposed about said tube having offset portions oppositely disposed on said plate, a sleeve on the outer edge of one of said portions, a pointer adjustably secured in said sleeve and a set screw in said sleeve for engagement with said pointer.

In testimony whereof I affix my signature, in presence of two witnesses.

THOMAS H. BRITTAIN.

Witnesses:
ROBT. W. RAYFORD,
ANTHONY E. FLEWELLEN, Jr.